United States Patent
Ashton et al.

(10) Patent No.: US 7,151,008 B2
(45) Date of Patent: Dec. 19, 2006

(54) FABRICATION METHOD FOR PHASE CHANGE DIODE MEMORY CELLS

(75) Inventors: Gary R. Ashton, Eagle, ID (US); Gary A. Gibson, Palo Alto, CA (US); Robert N. Bicknell-Tassius, Springfield, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/253,233

(22) Filed: Oct. 17, 2005

(65) Prior Publication Data
US 2006/0030068 A1    Feb. 9, 2006

Related U.S. Application Data

(62) Division of application No. 10/654,189, filed on Sep. 3, 2003, now Pat. No. 6,979,838.

(51) Int. Cl.
*H01L 21/06* (2006.01)
(52) U.S. Cl. .................. 438/102; 438/93; 257/E21.068
(58) Field of Classification Search ............... 438/102, 438/93, 95, 65; 257/E21.068
See application file for complete search history.

(56) References Cited

U.S. PATENT DOCUMENTS

| | | | |
|---|---|---|---|
| 5,557,596 A | 9/1996 | Gibson et al. | |
| 6,256,224 B1 | 7/2001 | Perner et al. | |
| 6,262,421 B1 | 7/2001 | Tran | |
| 6,784,361 B1 * | 8/2004 | Carlson et al. | 136/258 |
| 2002/0113250 A1 * | 8/2002 | Chaiken et al. | 257/200 |
| 2004/0218499 A1 * | 11/2004 | Chaiken | 369/94 |

OTHER PUBLICATIONS

Kampmann, et al., A Cadmuim-free CuInSe2 Superstate Solar Cell Fabricated by Electrodeposition Using a ITO/In2Se3/CuInSe2/Au Structure; PIP; (1999) pp. 129-135.
Rechid, et al., Characterising Superstrate CIS solar cells with electron beam induced current; Thin Solid Films; (2000) pp. 361-362.
Ward, et al. Cu(In,Ga)Se2 Thin-Film Concentrator Solar Cells; NCPV Program Review Meeting; Oct. 2001.
Scofield, et al. Sputtered molybdenum bilayer back contact for copper indium diselenide-based polycrystalline thin film solar cells; Thin Solid Films (1995) pp. 26-31.
Gabor, et al. High-efficiency CuInxGa1-xSe2 Solar cells made from (Inx,Ga1-x)2Se3 precursor films; American Institute of Physics, (1994) pp. 198-200.
Nakayama, et al. AES, LEELS and XPS studies on the interface formation between layered semiconductors GaSe and InSe; Surface Science (1991).
Nishida, et al. Single-beam overwrite experiment using In-Se based phase-change optical media; American Institute of Physics (1987) pp. 667-669.
Sanchez-Royo, et al. Optical and photovoltaic properties of indium selenide thin films prepared by van der Waals epitaxy; Journal of Applied Physics (2001) pp. 2818-2823.
Otsmane, et al. Epitaxy of layered semiconductor thin films; Applied Surface Science (1993) pp. 479-481.

(Continued)

*Primary Examiner*—Bradley Smith

(57) ABSTRACT

A method of forming a diode structure for a phase-change data storage array, having multiple thin film layers adapted to form a plurality of data storage cell diodes is disclosed. The method includes depositing a first diode layer of CuInSe material on a substrate and depositing a second diode layer of phase-change material on the first diode layer.

22 Claims, 5 Drawing Sheets

OTHER PUBLICATIONS

Emery, et al. Reflection high-energy electron diffraction studies of InSe and GaSe layered compounds grown by molecular beam epitaxy; Journal of Appl. Phy. (92) pp. 3256-3259.

Tatsuyama, et al. Heteroepitaxy between layered semiconductors GaSe and InSe; Applied Surface Science (1989) pp. 539-543.

Gashimzade, et al. Energy Spectrum and Effective Mass of Carriers in the InSe/GaSe superlattice; Z. Physics (1996) pp. 219-222.

Shigetomi, et al. Electrical and Photovoltaic properties of CU-doped p-GaSe/n-InSe heterojunction; Journal of Applied Physics; (2000) pp. 1520-1524.

* cited by examiner

SECTION A-A

FABRICATION METHOD FOR PHASE CHANGE DIODE MEMORY CELLS

This application is a divisional of U.S. Pat. No. 6,979,838, having U.S. patent application Ser. No. 10/654,189, filed Sep. 3, 2003.

FIELD OF THE INVENTION

The present invention relates to ultra-high density data storage devices. More particularly, the present invention involves ultra-high density data storage devices having diode memory cells using materials containing copper, indium, and selenium (CIS), and methods of fabricating the diode memory cells.

BACKGROUND OF THE INVENTION

Electronic devices, such as palm computers, digital cameras and cellular telephones, are becoming more compact and miniature, even as they incorporate more sophisticated data processing and storage circuitry. Moreover, types of digital communication other than text are becoming much more common, such as video, audio and graphics, requiring massive amounts of data to convey the complex information inherent therein. These developments have created an enormous demand for new storage technologies that are capable of handling more complex data at a lower cost and in a much more compact package. Efforts are now underway to enable the storage of data on a scale of ten nanometers (100 angstroms) up to hundreds of nanometers, referred to herein as "ultra-high density data storage."

One method of storing data at ultra-high densities involves utilizing a directed energy beam. As used herein a "directed energy beam" means a beam of particles, such as electrons, or a beam of photons or other electromagnetic energy, to heat the medium so that it changes states. As used herein, "state" is defined broadly to include any type of physical change of a material, whether from one form to another, such as crystalline to amorphous, or from one structure or phase to another, such as different crystalline structures. As used herein, the term "phase change" means a change between different states in a material.

A state change may be accomplished by changing a material from crystalline to amorphous, or the reverse, by the application of an electron or light beam. To change from the amorphous to crystalline state, beam power density is increased so as to locally heat the medium to a crystallization temperature. The beam is left on long enough to allow the medium to anneal into its crystalline state. To change from crystalline to amorphous state, the beam power density is increased to a level high enough to locally melt the medium and then rapidly decreased so as to allow the medium to cool before it can reanneal. To read from the storage medium, a lower-energy beam is directed to the storage area to cause activity, such as current flow representative of the state of the storage area.

To effectively sense contrasts in states or phases of phase-change materials, a diode may be formed having a junction for sensing carrier flow in response to an electron or light beam focused on a data storage memory cell in the phase-change layer. Such diode junctions are utilized for carrier detection in photovoltaic devices, in which light beams impact the diode, and in cathodovoltaic devices, in which electron beams are directed to the diode. Photovoltaic devices include phototransistor devices and photodiode devices. Cathodovoltaic devices include cathodotransistor devices and cathododiode devices. In addition, diode junctions may be utilized for carrier flow detection in photoluminescent and cathodoluminescent devices. Reference is made to copending patent application Ser. No. 10/286,010 [HP 20020-6667] filed on Oct. 31, 2002 for a further description of the structure and function of diode junctions in these devices.

Diode junction layers need to be composed of materials having electrical properties suitable for generating a desired carrier flow across the diode junction. As used herein, the term "carrier flow" refers to either electron current or the flow of holes, depending on whether the materials are n-type or p-type. As used herein, the term "materials" includes all kinds and types of compounds, alloys and other combinations of elements. Various types of junctions may be formed in the context of the above data storage devices, such as heterojunctions, homojunctions, and Schottky junctions, in order to achieve the desired detection results.

SUMMARY OF THE INVENTION

One embodiment comprises a method of forming a diode structure for a phase-change data storage array, having multiple thin film layers adapted to form a plurality of data storage cell diodes, wherein the method comprises depositing a first diode layer of CIS material on a substrate; and depositing a second diode layer of phase-change material on the first diode layer.

Other aspects and advantages of the present invention will become apparent from the following detailed description, which, when taken in conjunction with the accompanying drawings, illustrates by way of example the principles of the invention.

Figure 1:
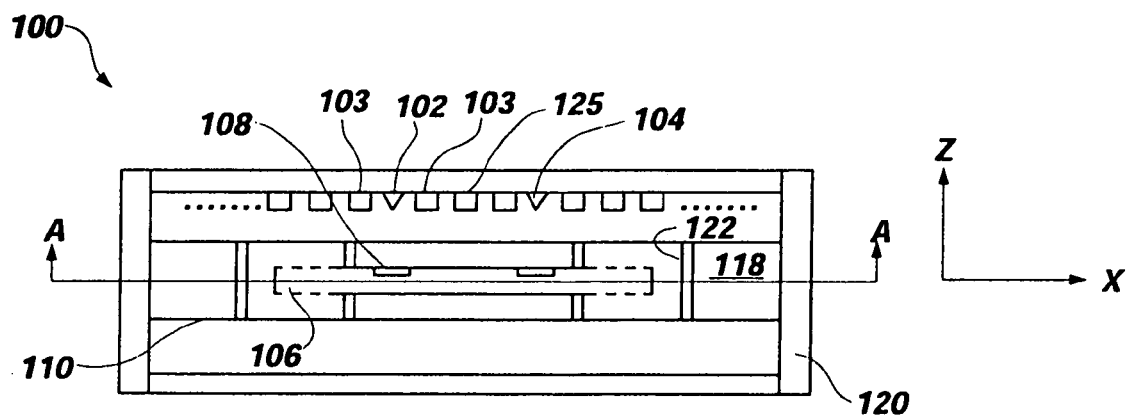
FIG. 1 is a partial side view of an exemplary data storage system.

The same numerals in the Figures are assigned to similar elements in all the figures. Embodiments of the invention are discussed below with reference to the Figures. However, those skilled in the art will readily appreciate that the detailed description given herein with respect to these figures is for explanatory purposes as the invention extends beyond these limited embodiments.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

FIG. 1 shows an exemplary ultra-high density data storage system 100 having electron emitters 102 and 104 and a phase-change data storage medium 106. Electron emitter 102 and 104 are mounted above the storage medium 106, that has a number of storage areas, such as 108, that are impacted by electron beams from the emitters. Micromovers, based on micro-electromechanical systems (MEMS) technology, cause relative movement between the phase-change medium 106 and the electron emitters 102. Micromover 110 is connected to the storage medium 106 and moves it relative to the emitters 102, 104, so that each emitter can impact a number of different data storage areas.

Figure 2:
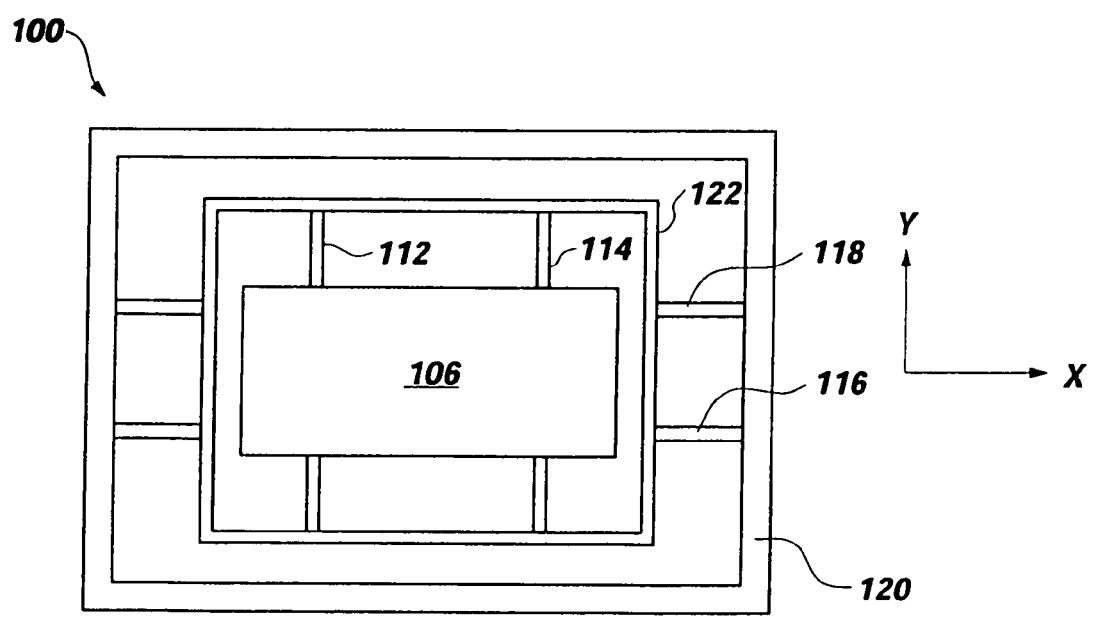
FIG. 2 is a plan view of the storage system shown in FIG. 1.

FIG. 2 is a top view of the cross section A—A in FIG. 1, showing the micro-mover 110 fabricated to scan the medium 106 in the X and Y directions. The storage medium 106 is supported two sets of thin-walled micro-fabricated flexible beams or springs 112 and 114 which flex to allow the medium 106 to move in the X direction with respect to a supporting frame 122. A second set of springs 116 and 118 are connected between the supporting frame 122 and the outer casing 120 and flex to allow the medium 106 and frame 122 to move in the Y direction with respect to the casing 120. The field emitters scan over the medium, or the medium scans over the field emitters in the X-Y directions by electrostatic, electromagnetic or piezoelectric means known in the art.

Figure 3:
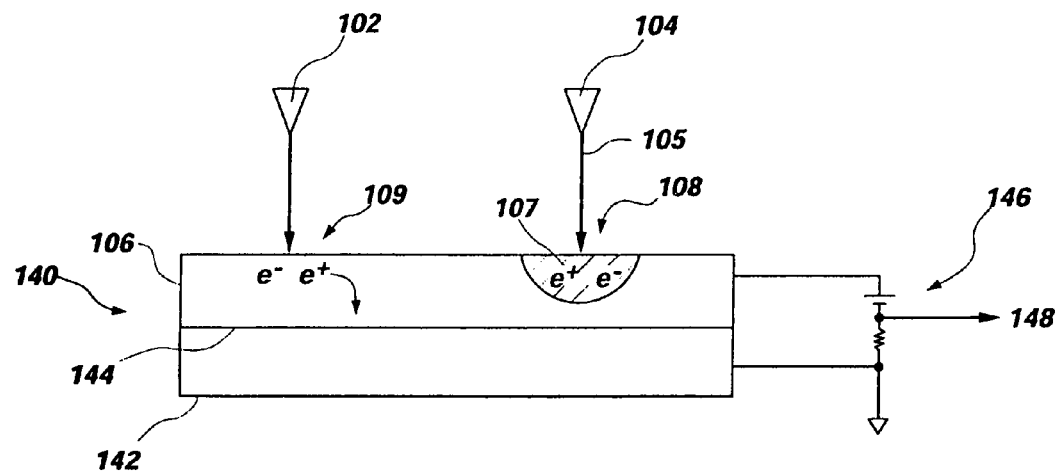
FIG. 3 is a schematic view of a portion of the storage system shown in FIG. 1.

FIG. 3 shows an exemplary diode structure 140 comprising the phase-change layer 106 described above and a second diode layer 142 forming a diode junction 144 at the interface of the two layers. Typically, phase-change layer 106 and second diode layer 142 have different electrical characteristics, to encourage the movement of carriers across the junction. For example, phase change layer 106 may be n-type and second diode layer 142 may be p-type. Doping may be used to change or enhance the electrical characteristics of each layer. An external circuit 146 is connected to the diode to impress a voltage across the junction so as to create a bias, either in a reverse direction or in a forward direction, depending on the needs of the circuit. An output 148 is generated by circuit 146 and is representative of the magnitude of carrier flow across junction 144.

Reading or detecting is carried out by directing a narrow beam of electrons 105 onto the surface of phase change layer 106 at data storage area 108. The incident electrons excite electron-hole pairs 107 near the surface of the storage area 108. The diode 140 is reversed-biased by external circuit 146 so that the minority carriers that are generated by the incident electrons drift toward the diode junction 144. Minority carriers that do not recombine with majority carriers before reaching the junction are swept across the junction, causing a current to flow in the external biasing circuit 146.

Figure 4:
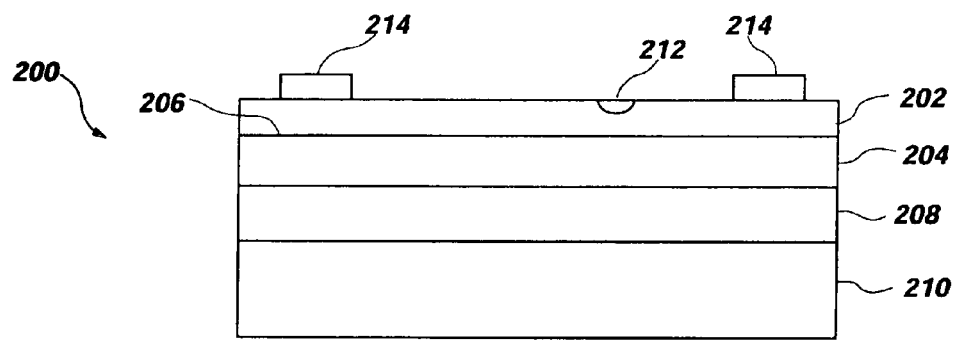
FIG. 4 is a schematic side view of the diode structure according to one embodiment of the present invention.

Writing onto diode 140 is accomplished by increasing the power density of the electron beam 105 enough to locally alter some property of the diode at storage area 108, such as collection efficiency of minority carriers. In FIG. 4, a schematic side view of a diode configuration 200 in accordance with one embodiment of the present invention is shown. A phase-change layer 202 is composed of indium and selenium in an indium selenide (InSe) compound which can be reversibly changed from an amorphous to a crystalline state by heating and cooling the InSe compound at suitable rates. This state change is useful for data storage, since the amorphous state is less conductive that the crystalline state. The InSe compound may be any InSe-type material. As used herein the terms "InSe compound," "InSe-type material" and "InSe layer" mean any compound of InSe, $In_2Se_3$ or a material in the group having the formula $In_xSe_{1-x}$.

When the InSe layer 202 is changed from the crystalline state to the amorphous state at the storage area 212, the electrical properties of the InSe layer significantly change. Accordingly, the number of carriers swept across the diode junction will be significantly different in the amorphous state than when InSe is in a crystalline state.

In FIG. 4, the second diode layer 204 is disposed below the phase-change layer 202 to form a diode junction 206. Since polycrystalline InSe-type materials are naturally n-type, the second diode layer 204 may be a p-type semiconductor layer or capable of being p-doped. The second diode layer 204 may be made of a material of copper indium selenide (CuInSe), also known as CIS. The terms "CIS," "CIS compound" or "CIS material" refer to a material having any ratio of copper, indium, and selenium, such as $CuInSe_2$, including but not limited to CIS doped with gallium (CIGS). The term "CIGS" refers to CuInSe doped with gallium to form various stoichiometric materials of copper indium gallium selenide including but not limited to $(Cu(In, Ga)Se_2)$ and $Cu(In_{1-x}Ga_x)Se_2$.

CIS materials are desirable for memory diode materials for a number of reasons. CIS compounds are similar to InSe-type materials, differing in the additional Cu element and a change in crystalline structure. Although the structures of these two compounds are different, the diode interface between layers of the two compounds is effective. Also, CIS can be readily doped with a p-type dopant which is required to work with InSe. Further, the CIS layer can be formed in the same vacuum system as an InSe layer, enabling the formation of a clean high quality interface between the two layers. This diode structure also reduces processing costs, since the time required for an additional fabrication stage is eliminated. In addition, CIS and CIGS materials tend to have relatively high melting temperatures, compared to InSe-type materials, so heat applied to the phase-change layer should not affect the CIS or CIGS layer. Finally, CIS materials tend to have good diode junction characteristics.

The diode configuration 200 shown in FIG. 4 may be used as a detection device in various data storage detection devices, such as photovoltaic devices, cathodovoltaic devices, photoluminescent devices and cathodoluminescent devices, all described above.

Figure 5:
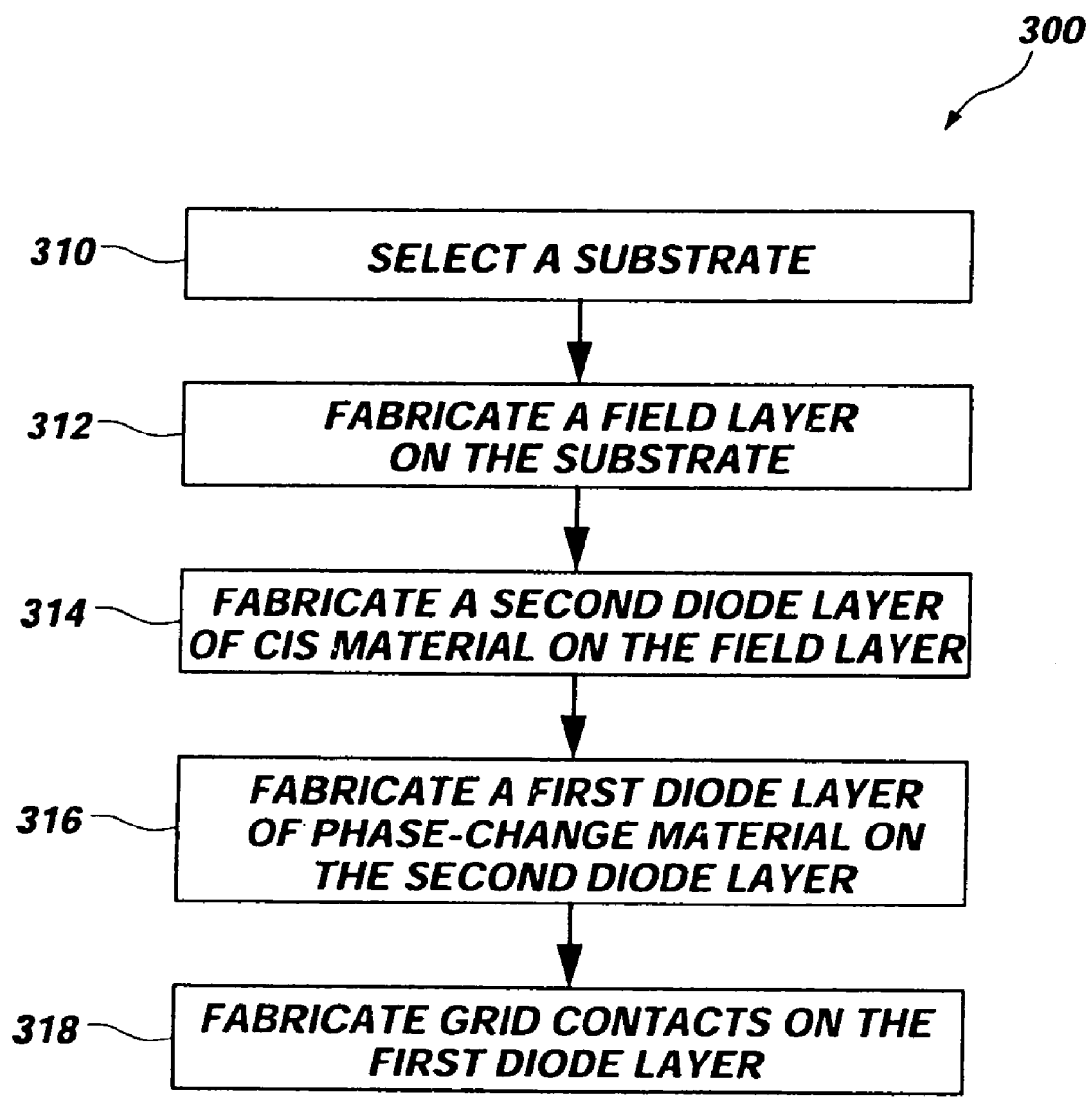
FIG. 5 is a flow chart describing a method for fabricating the diode structure shown in FIG. 4.

FIG. 5 discloses a method of fabrication 300 of the diode structure shown in FIG. 4. Fabrication of the diode structure 200 starts at step 310 with the selection of a substrate layer 210 from silicon or various silicon oxide materials. In the present embodiment, substrate 210 is preferably of a material that can be doped with sodium, which promotes the growth of the subsequent layers. Such material includes, but is not limited to, silicon, silicon oxide, soda lime glass, and other semiconductor materials. At step 312, an electrical potential field layer, or back contact, 208 is fabricated on the surface of substrate 210. Field layer 208 is fabricated from molybdenum (Mo) using a sputtering technique, known to those skilled in the art, to a thickness of 0.5–2.0 microns, with 1 micron being used in this embodiment. Other suitable conductive materials are indium, titanium nitride, platinum, gold, zinc oxide, indium tin oxide and/or nickel.

Next, at step 314, second diode layer 204 is fabricated on field layer 208. Other suitable phase-change materials may be used. In this embodiment, diode layer 204 is preferably fabricated with a CIS compound and is doped with a p-type dopant. Second diode layer 204 has a thickness range of about 1 to 6 microns with 3.5 microns being used in this embodiment, and is applied by elemental evaporation in a vacuum. Other methods of fabrication can include sputtering or electrodeposition using an electrolyte of $K_2SO_4$, $CuSO_4$, $In_2S(SO_4)_3$, and/or $SeO_2$. As previously mentioned, second diode layer 204 may also be doped with gallium to form $CuInGaSe_2$ or other CIGS compounds.

At step 316, after application of the second diode layer 204, the first diode layer 202 is fabricated on layer 208. In the present embodiment, first diode layer 202 is fabricated with $In_2Se_3$, being a natural n-type material. First layer 202 has a thickness range of 50–200 nm, with 100 nm being used in this embodiment. First layer 202 may be applied by elemental evaporation in vacuum, which may be the same vacuum used to apply the second layer 204. In an alternative embodiment, fabrication of first layer 202 can be performed with electrodeposition using an electrolyte.

In an embodiment in which layer 204 is a CIGS material, layer 204 may be grown using a three-stage co-evaporation process. First, an $(InGa)_2Se_3$ layer is deposited at 400° C., followed by evaporation of Cu and Se at 550° C. to make the film slightly Cu-rich. The composition is restored to slightly Cu-poor by the addition of $(InGa)_2Se_3$ again. Next, the InSe layer is thermally evaporated from elemental sources onto a heated surface. InSe is a natural n-type material, so no doping is required. Further, Cu can diffuse from the second diode layer of CuInSe into the InSe top layer to enhance the n-type doping.

At step 318, electric grid contacts 214 are fabricated on the surface of layer 202 because the first layer of InSe 202 has a low electrical conductivity. Contacts 214 are made of a conductive material the same as or similar to field layer 208. For example, grid contacts 214 can be made of Mo at a thickness ranging from 0.5 to 5 microns, with 1 micron used in this embodiment. Alternately, the grids may be made of other suitable materials, such as Au or In. The material may be sputter-deposited or made by any other suitable fabrication techniques known to those skilled in the art. Grid contacts 214 and field layer 208 may be the connection points for applying a voltage source circuit to the diode 200 during a read operation.

Testing has been performed on sample diodes as embodied in the present invention. The tests have included measuring the I–V characteristics of the diodes, performing quantum efficiency (optical), and performing electron beam induced current (EBIC) measurements, which simulate a "read" mode for data storage.

Figure 6:
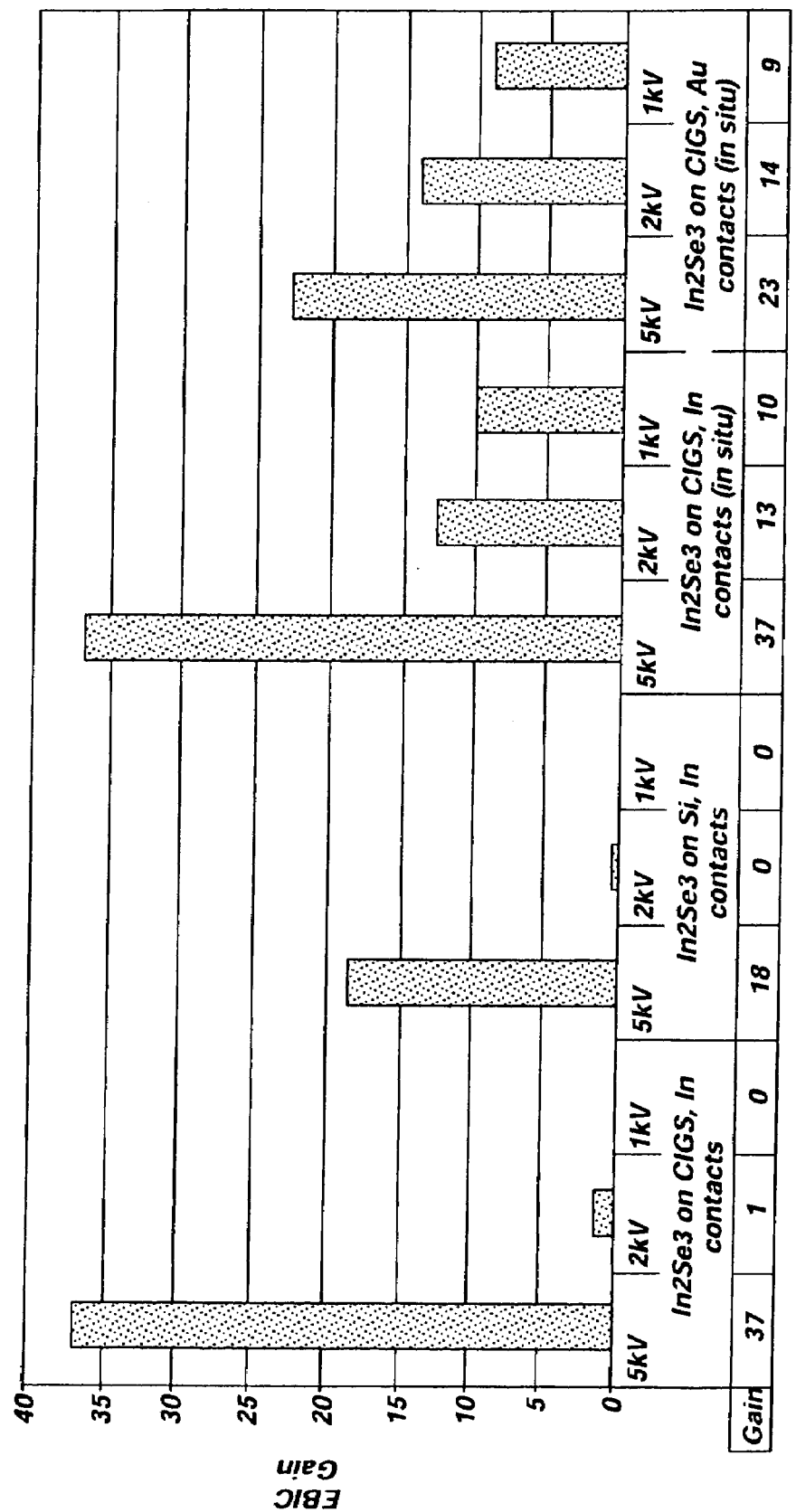
FIG. 6 is a bar graph showing EBIC diode characteristics according to four diode embodiments of the present invention.

FIG. 6 contains bar graphs showing EBIC gain as a function of emitter beam voltage for diodes having $In_2Se_3$ as the top layer with In or Au contacts and Si or CIGS as a bottom layer. The EBIC gain is diode current output divided by electron beam current. In the first two samples, $In_2Se_3$ was applied after the substrate was exposed to air. The second two samples (in situ) were fabricated by depositing both layers in a vacuum without exposure to air during the process.

As shown in the FIG. 6 graph, the EBIC variations are not linear with variations in emitter beam energy, because more energetic electron beams result in both more electron-hole pairs and deeper penetration. Although 5 kV beams may be used, beams of 1 kV or less may be utilized in most applications. Beam current may vary from 0.5 nA to as high as 200 nA, with about 20 nA being used in some applications. As seen from the graph, EBIC gain is considerably better with CIGS rather than Si as a bottom diode layer. Also, the gain is substantially higher if the diode is fabricated in a vacuum.

Figure 7:
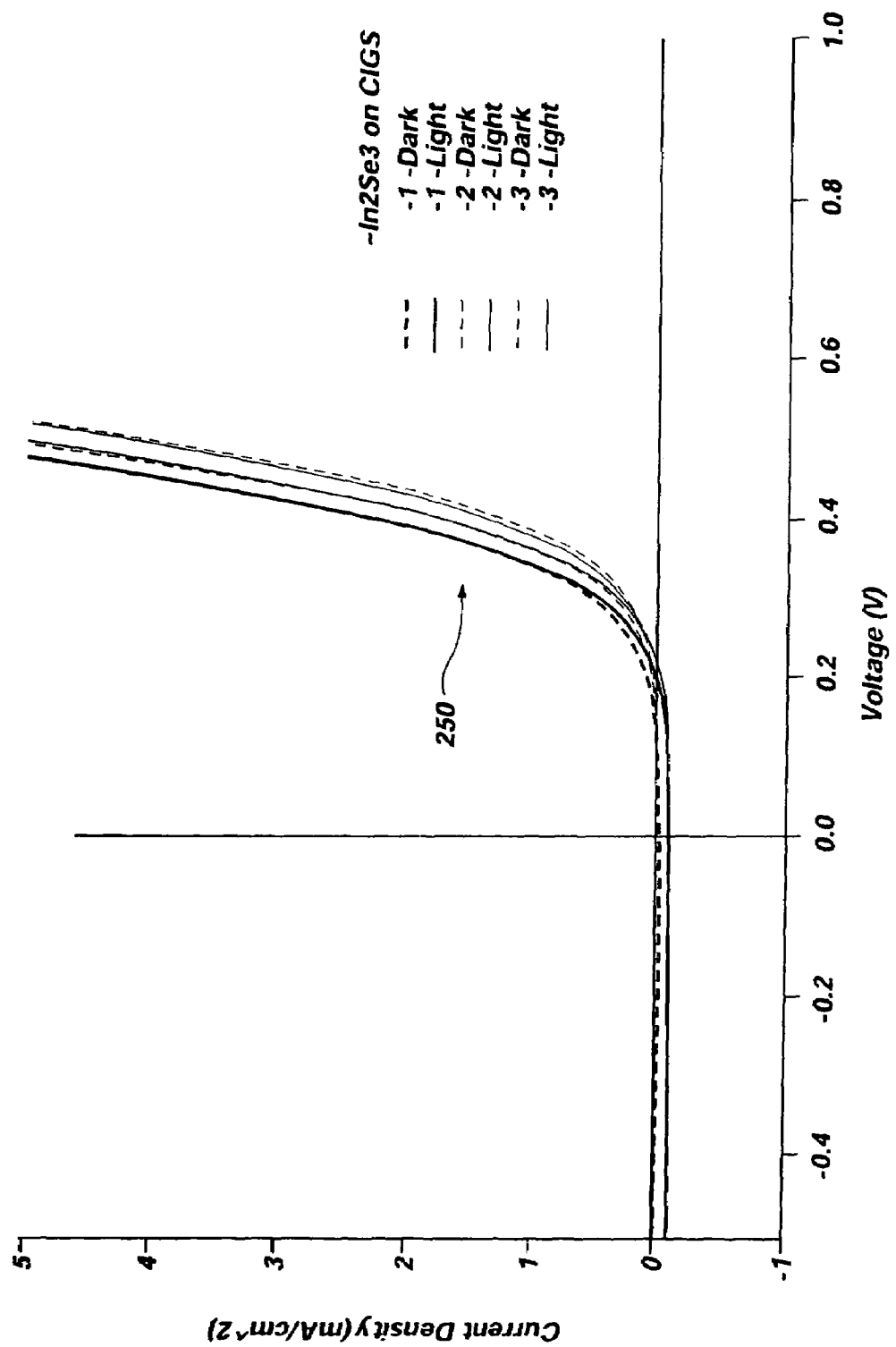
FIG. 7 is a graph showing the current-voltage characteristics of a diode according to one of the embodiments of FIG. 6.

FIG. 7 shows the current-voltage characteristics for three samples of the first diode listed in FIG. 6. As shown in FIG. 7, the applied voltage causes essentially zero current until it reaches about 200 mV, after which there is a sharp increase in current. The open circuit voltage is 5 mV and the short circuit current density is about 2 to 3 mA cm$^2$.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A method of forming a diode structure for a phase-change data storage array, having multiple thin film layers adapted to form a plurality of data storage cell diodes, comprising:
   depositing a first diode layer of CIS material on a substrate; and
   depositing a second diode layer of phase-change material on the first diode layer.

2. The method of claim 1, wherein the phase-change material is InSe material.

3. The method of claim 1, wherein the phase-change material is $In_xSe_{1-x}$ compound.

4. The method of claim 1, wherein the steps of depositing the first diode layer and the second diode layer are done in a same vacuum system.

5. The method of claim 1, wherein the steps of depositing the first diode layer and the second diode layer are done by electrodeposition.

6. The method of claim 1, wherein the steps of depositing the first diode layer and the second diode layer are done using an electrolyte.

7. The method of claim 1, further comprising depositing a field layer on the substrate prior to depositing the first diode layer.

8. The method of claim 7, wherein the field layer is deposited by sputtering.

9. The method of claim 7, wherein the step of depositing a field layer further comprises fabricating the field layer from a material selected from the group of conductive materials comprising molybdenum, indium, titanium nitride, platinum, gold, zinc oxide, indium tin oxide and nickel.

10. The method of claim 1, wherein the steps of depositing the first diode layer and the second diode layer are done by performing elemental evaporation in vacuum.

11. The method of claim 1, wherein the steps of depositing the first diode layer and the second diode layer are done by sputtering.

12. The method of claim 1, wherein the CIS material is p-doped.

13. The method of claim 1, further comprising the step of providing a substrate selected from the group consisting of silicon, silicon oxide and soda lime glass.

14. The method of claim 1, further comprising depositing contacts on a surface of the second diode layer.

15. The method of claim 14 wherein the step of depositing contacts on the surface of the second diode layer further comprises fabricating contacts from a material selected from the group of conductive materials consisting of indium and gold.

16. A method of forming a diode structure for a phase-change data storage array, having multiple thin film layers adapted to form a plurality of data storage cell diodes, comprising:
   providing a substrate;
   fabricating a field layer on the substrate;
   depositing a first diode layer of CIS material on the field layer; and
   depositing a second diode layer of phase change material on the first diode layer.

17. The method of claim 16, wherein the step of providing a substrate comprises selecting a substrate material chosen from the group of materials consisting of silicon, silicon oxide, and soda lime glass.

18. The method of claim 16, wherein the step of fabricating a field layer on the substrate comprises fabricating the field layer from a material selected from the group of conductive materials comprising molybdenum, indium, titanium nitride, platinum, gold, zinc oxide, indium tin oxide and nickel.

19. The method of claim 16, wherein the step of depositing the first diode layer and the second diode layer are done in a same vacuum system.

20. The method of claim 16, wherein the step of depositing the first diode layer comprises forming the first diode layer from p-doped CIS material.

21. The method of claim 16, wherein the step of depositing the second diode layer comprises forming the second diode layer from an InSe compound.

22. A method of forming a diode structure for a phase-change data storage array, having multiple thin film layers adapted to form a plurality of data storage cell diodes, comprising:
   providing a substrate;
   fabricating a field layer on the substrate;
   depositing a first diode layer of CIGS material on the field layer; and
   depositing a second diode layer of phase change material on the first diode layer.

* * * * *